July 24, 1923.

E. C. TAYLOR 1,462,586

SHUTTLE BALANCING MECHANISM

Filed Nov. 3, 1922

INVENTOR

Edward C. Taylor

July 24, 1923.
E. C. TAYLOR
1,462,586
SHUTTLE BALANCING MECHANISM
Filed Nov. 3, 1922    2 Sheets-Sheet 2
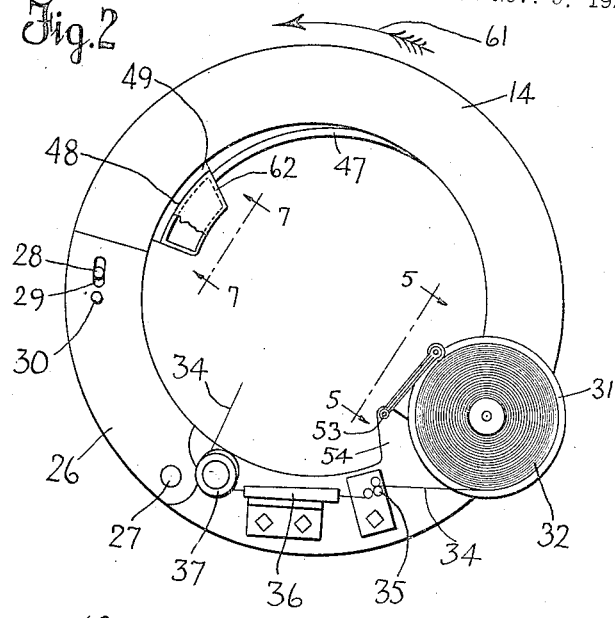
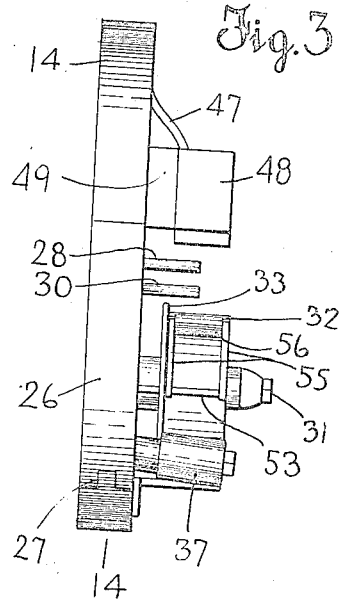
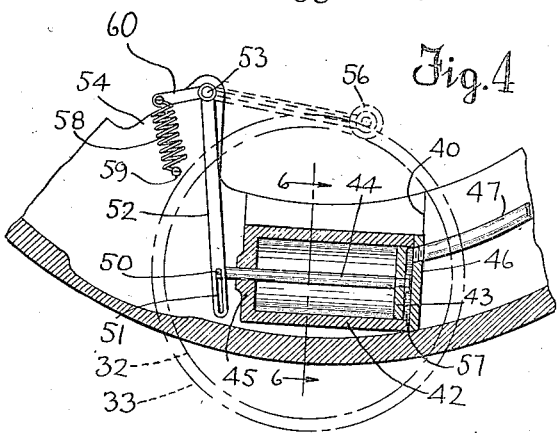
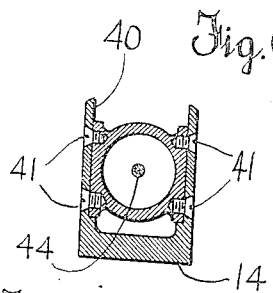
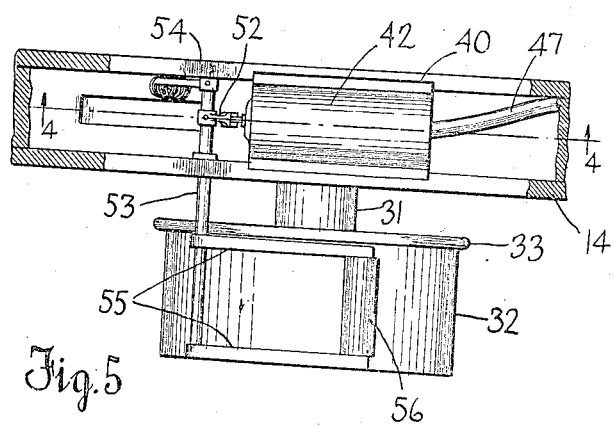
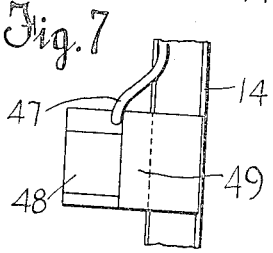
INVENTOR
Edward C. Taylor Patented July 24, 1923.

1,462,586

UNITED STATES PATENT OFFICE.

EDWARD C. TAYLOR, OF LONGMEADOW, MASSACHUSETTS, ASSIGNOR TO THE FISK RUBBER COMPANY, OF CHICOPEE FALLS, MASSACHUSETTS, A CORPORATION OF MASSACHUSETTS.

SHUTTLE-BALANCING MECHANISM.

Application filed November 3, 1922. Serial No. 598,712.

*To all whom it may concern:*

Be it known that I, EDWARD C. TAYLOR, a citizen of the United States of America, residing at Longmeadow, in the county of Hampden and State of Massachusetts, have invented certain new and useful Improvements in Shuttle-Balancing Mechanism, of which the following is a specification.

My present invention relates to improvements in machines in which a rotating member commonly known as a shuttle carries a spool of material around an article to be wrapped or wound with such material, and has for its object the improvement of the balancing of such shuttle, particularly with a view to compensating for the change in weight due to the withdrawal of material from the spool. It finds one specific application in machines for wrapping annular objects such as coils of wire or tire casings, and it will be described in connection therewith.

The invention will now be described with reference to the accompanying drawings, in which—

Fig. 2 is a view of the wrapping shuttle showing my improvements embodied therein;

Fig. 3 is a side elevation thereof, looking from the left in Fig. 2;

Fig. 4 is a sectional detail thereof, taken on line 4—4 of Fig. 5;

Fig. 5 is a partial interior view of the shuttle, looking on line 5—5 of Fig. 2;

Fig. 6 is a section on line 6—6 of Fig. 4;

Fig. 7 is a partial interior view of the shuttle, taken on line 7—7 of Fig. 2.

A limiting factor in the speed of operation of wrapping or winding machines is the speed with which the shuttle carrying the wrapping or winding material can be rotated. In increasing this speed it becomes of increasing importance to have the shuttle accurately balanced. In prior machines as far as I am aware, any attempts at balancing have been rendered practically useless by the unbalance caused by the variations in weight of the spool of material carried by the shuttle as the material is gradually unwound and applied to the article. If the shuttle were balanced when the spools were full it would become progressively more unbalanced as material were withdrawn from the spool. If it were balanced when an intermediate amount of material were on the spool it would be unbalanced when the spool was either full or empty. These considerations have led to a general disregard for balancing, and a consequent limitation on the speed of the shuttle.

By my invention I am enabled to provide a shuttle balanced at all conditions of the material supply, a result never before accomplished to my knowledge. I accomplish this in the preferred embodiment shown, by shifting a weight from one point of the shuttle to another so as to compensate for the loss of weight due to the withdrawal of material from the spool. I contemplate, however, accomplishing the same result by different means, as by moving the spool or a weight, or both, radially outwardly to compensate by the difference in radial position for the change in weight. This shifting of weights is controlled by mechanism responsive to the amount of material upon the spool. This amount may be either the weight or the bulk of the material. Theoretically, weight-responsive mechanism would give greater accuracy in balancing, but the error, if any, introduced by the substitution of bulk-responsive mechanism, is so small as to be in most instances negligible and is important only when the nature of the material being employed is subject to change. In the present case I have illustrated bulk-responsive mechanism, as the construction is somewhat simpler, but intend in the claims to cover the invention both in that specific form and also broadly so as to cover forms responsive to the weight of the material.

Figure 1:
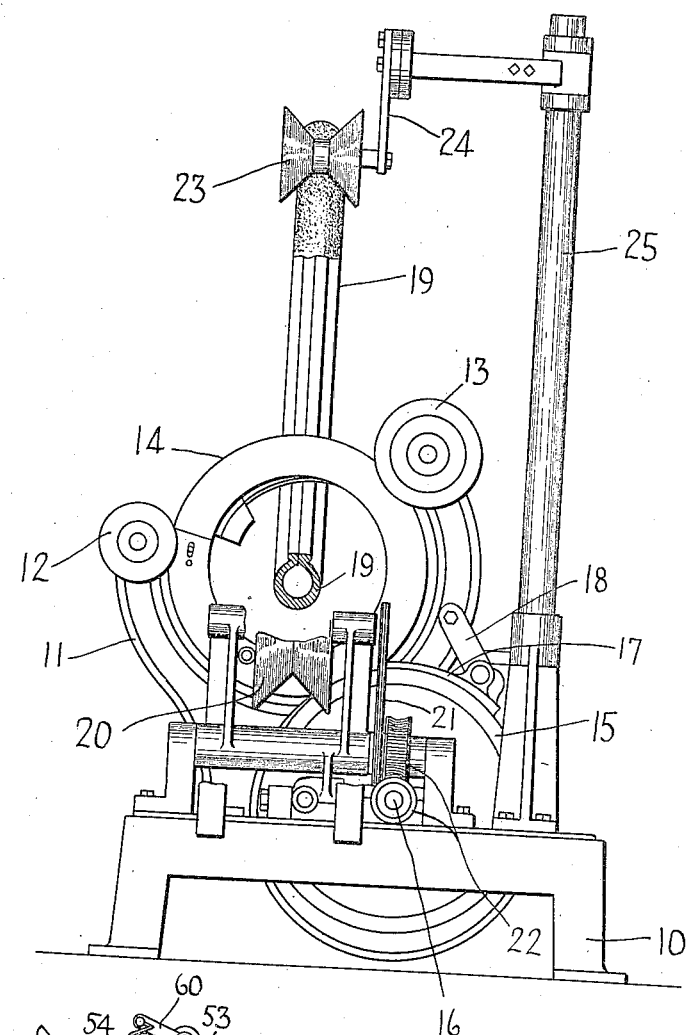
Fig. 1 is an elevation of a machine embodying the invention, partly broken away, and illustrating the application of the invention to a machine designed for wrapping annular tire casings.

Turning now to the specific mechanical embodiment shown, the invention has been illustrated (Fig. 1) as applied to a machine of a commercial type having a base 10, a standard 11, with guide rollers 12 and 13 for a shuttle 14. This shuttle is driven frictionally by a flanged drive wheel 15 mounted on a drive shaft 16. A brake shoe 17, carried by an arm 18 and operable through suitable connections from a convenient point, serves to stop the rotation of the shuttle after a tire has been wrapped. A suitable clutch (not shown) may be provided to connect the drive shaft 16 to a source of power. The tire casing 19 is threaded through the shuttle and is supported by a pair of grooved rolls 20, only one of which appears in the drawings. These rolls are driven by a chain connection 21 from a shaft at right angles to shaft 16 and driven by worm gearing 22 therefrom. At its top the tire is guided by a grooved roll 23 mounted in swinging frame 24 on an upright 25. This much of the machine is standard, and is shown for the purpose of illustrating one setting of the invention. For a fuller description of this general type of machine, reference may be made to the patent to Pierce 1,263,923, April 23, 1918. It will be understood, however, that the invention is not restricted in its use to that type of machine shown.

The general construction of the shuttle will appear more fully from Figs. 2 and 3. In order to permit the tire to be wrapped being inserted within the shuttle, the latter is provided with a gate section 26 hinged at 27 to the main portion of the shuttle. A convenient means of fastening the gate in closed position comprises a bolt or latch (not shown) to which is connected a pin 28 slidable in a slot 29 in the gate. A stationary pin 30 is also secured to the gate to assist the operator in operating the latch. By grasping both pins the latch is withdrawn and the gate may be swung open about its pivot 27. Secured to the main part of the shuttle is a spindle 31 upon which the paper spool 32 is carried. To place the paper spool upon the spindle it is forced over the latter until it strikes against a flange 33, in which position the paper is in correct alignment with the other parts. It may be mentioned that the paper is wound upon a hollow cylindrical core, usually of pasteboard, of a suitable size to fit singly over the spindle. The spindle may, if desired, be provided with suitable tension devices which will prevent spinning of the roll when the machine is stopped, and will cause the paper to be drawn off with the tautness desired. One form of device for this purpose is described in the Pierce patent referred to. From the spool the paper strip 34 passes through tension rolls 35, through an edge folder 36, and over a guide roller 37 to the tire, around which it is wrapped in a manner common to machines of this type.

I now come to the description of the mechanism in which my invention is chiefly located. It will be seen from the above description that with the elements thus far considered the shuttle will be out of rotative balance at all but one stage of the withdrawal of paper from the spool no matter how carefully it may be originally balanced. For example, if when the spool is full the shuttle is balanced by the addition of a weight at a point opposite the spool, the shuttle can be placed on balance at that time, but as paper is withdrawn from the spool, that side of the shuttle becomes lighter and the shuttle consequently unbalanced.

The mechanism provided to remedy this difficulty is illustrated in detail in Figs. 4 to 8. The shuttle is preferably constructed in a U section with the cross bar outside and forming a bearing surface for the rollers 12 and 13 and drive wheel 15. Fitted within a cut 40 in the interior of the shuttle by screws 41 is a cylinder 42. Slidable in this cylinder is a piston 43 to which is attached a piston rod 44 running in a bearing in one end wall 45 of the cylinder. The other end wall 46 is preferably made detachable for convenience in assembly. Threaded through the wall 46 is a pipe 47 leading, preferably on an inwardly directed spiral, to a reservoir 48 situated on the shuttle diametrically opposite the cylinder and secured in place by any convenient means, as by a bracket 49 fastened within the U section of the shuttle in a similar manner to cylinder 42. This reservoir is preferably offset from the body of the shuttle in the same manner as the paper spool and attendant parts, so as to preserve the shuttle in dynamic balance and prevent wobbling when running at high speeds. The cylinder, reservoir, and the pipe 47 connecting the two, form a closed system in which a definite quantity of a heavy liquid such as mercury is placed.

The quantity employed is preferably such as to fill cylinder 42 without exhausting the reservoir (thereby avoiding air traps) and the volume of the reservoir is great enough so that at no time will it be completely filled with the liquid. If the piston 43 is drawn to the left in Fig. 4, liquid will be drawn into the cylinder from the reservoir, the small amount of air always present in the reservoir expanding and thereby permitting the flow of liquid. Various other factors of construction and operation which affect the flow of liquid will be discussed later.

The position of the piston is controlled by the amount of paper on the roll so that the desired quantity of liquid will be present in the cylinder at all times. To this end there is a pin 50 in the end of the piston rod 44, working in a slot 51 in an arm 52 fast on a shaft 53 extending between and journaled in extensions 54 of the sides of the shuttle. This shaft extends beyond one wall of the shuttle to a position beside the paper spool (Figs. 3 and 5). Fastened to the shaft at points outside the shuttle wall are arms 55, carrying between them a feeler roll 56 adapted to bear on the surface of the paper spool. As paper is withdrawn, the roll 56 will ride on the constantly lessening circumference of the spool, and the parts will gradually move from the position of Fig. 4 to that of Fig. 8 causing more and more liquid (indicated at 57) to be drawn into the cylinder 42 from reservoir 48. It will be remembered that the shuttle is rotating during the time when the balancing mechanism is operative, and that therefore centrifugal force will cause the roller 56 to be pressed at all times during rotation of the shuttle against the paper on the spool. To avoid excessive pressure from this cause, particularly when the diameter of the paper spool is small and therefore the paper being drawn therefrom is normally under more tension, and also to assist in returning the roller 56 to its inner position (that of Fig. 4) when the shuttle is stopped, a spring 58 is secured at one end to a pin 59 on the shuttle wall and at its other end to an arm 60 secured to shaft 53.

If desired, pin 59 may be made adjustable to vary the tension on the spring. Also roller 56 may be made adjustable on the arms 55, thereby changing the relation of its lever arm to that of the lever arm operating the piston rod, and therefore varying the amount of liquid that will be drawn into the cylinder for a given movement of the roller. This latter adjustment can be used to compensate for the varying weight of different papers that may be used, a heavy paper requiring more liquid to compensate for its withdrawal than a lighter paper. For any given paper, however, the roller is fixed.

Figure 8:
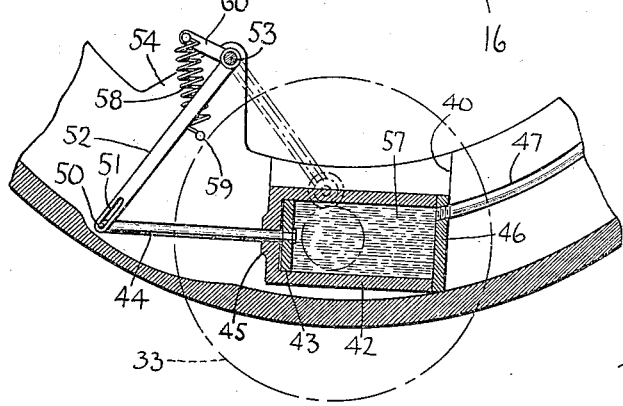
Fig. 8 is a view similar to Fig. 4 showing a different position of the parts.

It will be noticed from Figs. 4 and 8 that the maximum movement of the piston 43 due to the withdrawal of a unit thickness of paper will occur with the parts in the position of Fig. 4, due to the relative leverage effects of the roller on the paper and of the arm 52 on the piston rod in these positions. This conforms to the result desired, for a greater reduction in weight will be caused by the withdrawal of one layer of paper when the spool is full than when it is nearly empty as the length of the paper withdrawn is greater in the first case than in the second.

The shuttle is preferably rotated in the direction of the arrow 61 in Fig. 2, since this causes various desirable effects with the arrangement of mechanism shown. It is convenient to have the roller 56 in the position of Fig. 4 whenever the shuttle is stopped, as balance is not then necessary and it renders the paper spool more accessible to the operator, as for replacement. When the shuttle is started rotating in the direction of the arrow, the inertia of the liquid in the pipe 47 will tend to cause it to flow into cylinder 42, both forcing the roller 56 into contact with the paper and immediately causing the shuttle to be correctly balanced. When the shuttle is stopped, the reverse action will take place, inertia of the liquid causing it to flow from the cylinder to the reservoir and cause the roller to move to the position of Fig. 4.

The spiral arrangement of pipe 47 is not necessary, but is desirable in order to assist in the flow of liquid from the reservoir to the cylinder. As the liquid tends to move outwardly under the influence of centrifugal force when the shuttle is rotating, there will be a constant tendency for it to flow towards the cylinder and cause the latter to be always full to the maximum capacity permitted by the position of the piston. It is desirable to have the pipe 47 enter the reservoir at an outer corner, as centrifugal force will keep the liquid in the outside portion of the reservoir.

One side of the reservoir has been shown beveled at 62. When the shuttle is stopped, it is turned to a position where the gate 26 will be at the top, permitting it to be opened and a tire inserted or removed. With the shuttle in this position the beveled wall 62 will slant downwardly so as to cause the liquid to flow by gravity towards pipe 47, thereby avoiding the formation of air traps. If desired, instead of making the reservoir sufficiently large so that expansion of the air therein will permit the liquid to flow, a breather plug may be inserted in one wall of the reservoir. This plug may be made of porous porcelain or a finely woven fabric such as bolting cloth, through which air can pass but which will be impervious to the liquid used, which on account of its weight is preferably mercury.

The operation and effect of the described mechanism may now be considered. Assuming a fresh spool of paper to be placed on the spindle 31, the position of the parts is shown in Fig. 4. The piston is at its right hand limit of travel in the cylinder, and the liquid 57 is in the reservoir 58, except for the small amount present in the cylinder and that in pipe 47. The amount of liquid is so chosen that the shuttle will be balanced in this condition, the exact amount being dependent upon the weight paper being used. The mechanical parts are preferably counterbalanced where necessary so that the shuttle is balanced except for the paper. As the paper is gradually withdrawn from the spool during the use of the machine, the roller 56 will gradually move the piston to the left, drawing more and more liquid from the reservoir to the cylinder. It will only be necessary to provide cylinder capacity for a bulk of liquid weighing about half the weight of paper withdrawn, as the shifting of liquid from one side of the shuttle to the other produces a double effect. The liquid in the pipe presents a constant balancing effect at all times as although the liquid moves to and fro in the pipe, the pipe is always full. As shown, there is a difference in radial position between the reservoir and cylinder. The greater radius at which the cylinder is mounted creates both a tendency for the liquid to flow towards the cylinder, and reduces the amount of liquid which needs to be used, as liquid at the greater radius of the cylinder has a greater rotative balancing effect than liquid at the lesser radius of the reservoir.

Having thus described my invention, I claim:

1. In a wrapping or winding machine, a rotatable member adapted to carry wrapping or winding material, and means responsive to the amount of material on the member for preserving the member in rotative balance.

2. The combination with a wrapping or winding machine, having a rotatable material carrying member from which material is withdrawn as used, of means responsive to the amount of material on the member for preserving the member in rotative balance.

3. The combination with a wrapping or winding machine, having a rotatable material carrying member from which material is withdrawn as used, of means responsive to the bulk of material on the member for preserving the member in rotative balance.

4. In a wrapping or winding machine, a rotatable member adapted to carry a supply of material which is depleted during the operation of the machine, a movable weight carried by the member, and means responsive to the amount of material in the supply for shifting the position of the weight to compensate for the change in rotative balance caused by the depletion of the supply.

5. In a wrapping or winding machine, a rotatable member adapted to carry a supply of material which is depleted during the operation of the machine, a movable weight carried by the member, and means responsive to the bulk of material in the supply for shifting the position of the weight to compensate for the change in rotative balance caused by the depletion of the supply.

6. In a wrapping or winding machine, a rotatable member adapted to carry a supply of material which is depleted during the operation of the machine, a liquid retaining system carried by said member, and means responsive to the amount of material in the supply for shifting the liquid in the system to compensate for the change in rotative balance caused by the depletion of the supply.

7. In a wrapping or winding machine, a rotatable member, a spool holder on the member adapted to carry a spool of material, a feeler adapted to rest on the surface of the spool, and mechanism controlled by the feeler for compensating for the change of rotative balance caused by the withdrawal of material from the spool.

8. In a wrapping or winding machine, a rotatable member, a spool holder on the member adapted to carry a spool of material, a feeler adapted to rest on the surface of the spool, and mechanism controlled by the feeler for shifting weight adjacent the spool from remote points on the member, thereby to compensate for changes in rotative balance caused by the presence of various quantities of material on the spool.

9. In a wrapping or winding machine, a rotatable member, a spool holder on the member adapted to carry a spool of material, a feeler adapted to rest on the surface of the spool, a liquid-containing cylinder located adjacent the spool, a reservoir at a remote point of the member, piping connecting the cylinder and reservoir, and a piston in the cylinder operably connected with the feeler to draw into the cylinder varying quantities of liquid according to the amount of material on the spool.

10. In a wrapping or winding machine, a rotatable member, a spool holder on the member adapted to carry a spool of material, a feeler adapted to rest on the surface of the spool, and mechanism controlled by the feeler for compensating for the change of rotative balance caused by the presence of various quantities of material on the spool, said mechanism being constructed and arranged to cause the feeler to move out of contact with the spool when the machine is stopped.

11. In a wrapping or winding machine, a rotatable member adapted to carry a supply of material which is depleted during the operation of the machine, a movable weight carried by said member, means for shifting the position of the weight to compensate for the change in rotative balance caused by the depletion in the supply, and means for rendering the shifting means inactive and returning the weight to initial position upon stoppage of the rotation of said member.

12. In a wrapping or winding machine, a rotatable circular member adapted to carry a supply of material which is depleted during the operation of the machine, devices supporting said member at its outer periphery to permit its rotation, a movable weight, carried by said member and located at all times within the circumference of the supporting device, and means for shifting the position of the weight to compensate for the change in rotative balance caused by the depletion in the supply.

13. In a wrapping or winding machine, a rotatable annular member adapted to carry a supply of material which is depleted during the operation of the machine, a weight system adapted to be localized in said annulus either adjacent the material supply or at a point substantially diametrically opposite thereto, and means for changing the distribution of the weight system between the two points of localization to compensate for the change in rotative balance caused by the depletion in the supply.

14. In a wrapping or winding machine, a rotatable member adapted to carry a supply of material which is depleted during the operation of the machine, a movable weight carried by the member adapted to be shifted to preserve the member in rotative balance with varying amounts of material in the supply, said feeler being automatically projected into operative feeling position on rotation of the member, and weight shifting mechanism controlled by the position of the feeler.

EDWARD C. TAYLOR.